Dec. 8, 1964  H. H. GREEN ETAL  3,159,956
TRACTOR MOUNTED HARVESTERS
Original Filed April 15, 1959  4 Sheets-Sheet 2

INVENTORS
HOMER H. GREEN
BY ROBERT R. RADKE
RICHARD R. STEINGAS
Carlsen & Carlsen
ATTORNEYS

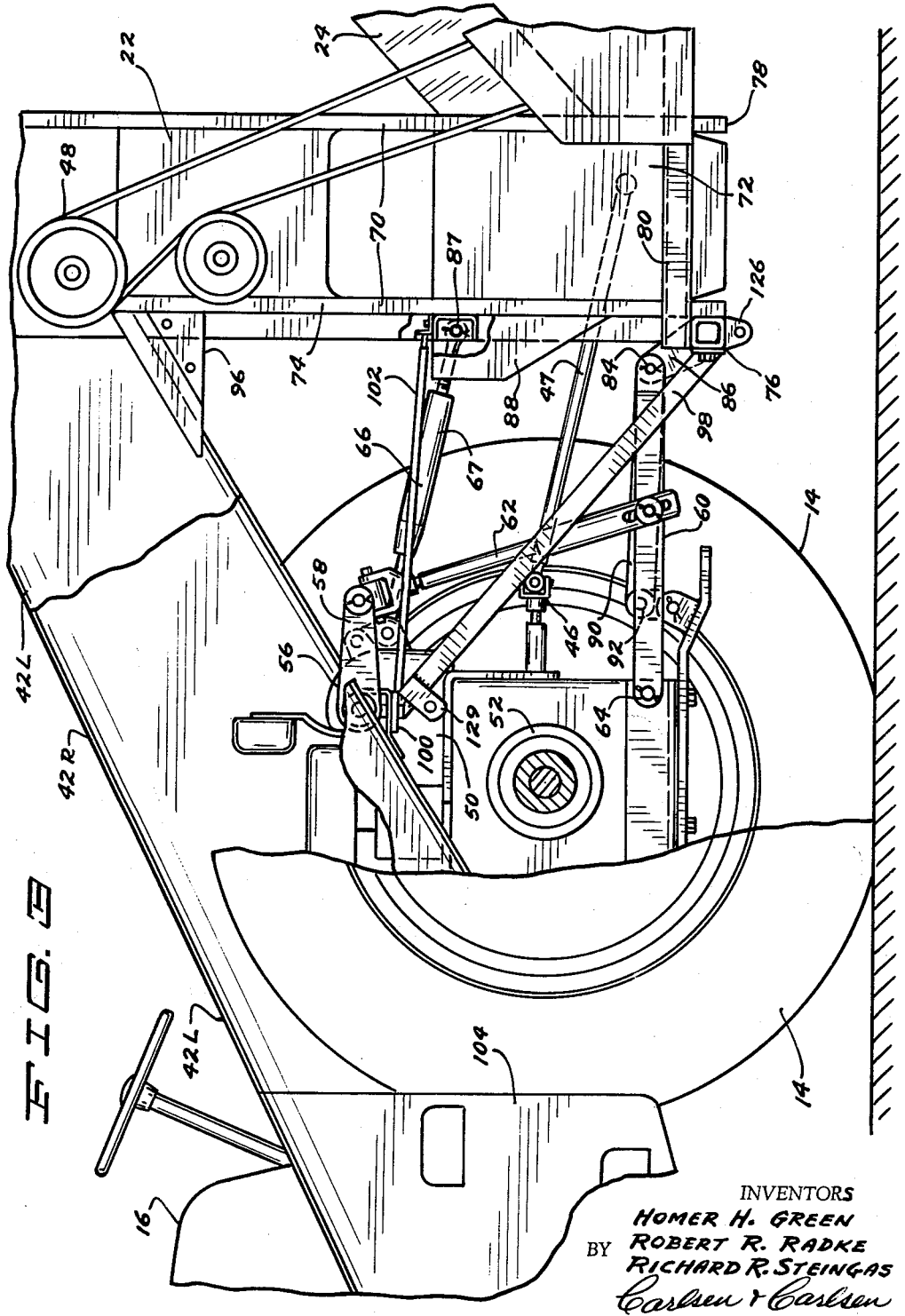

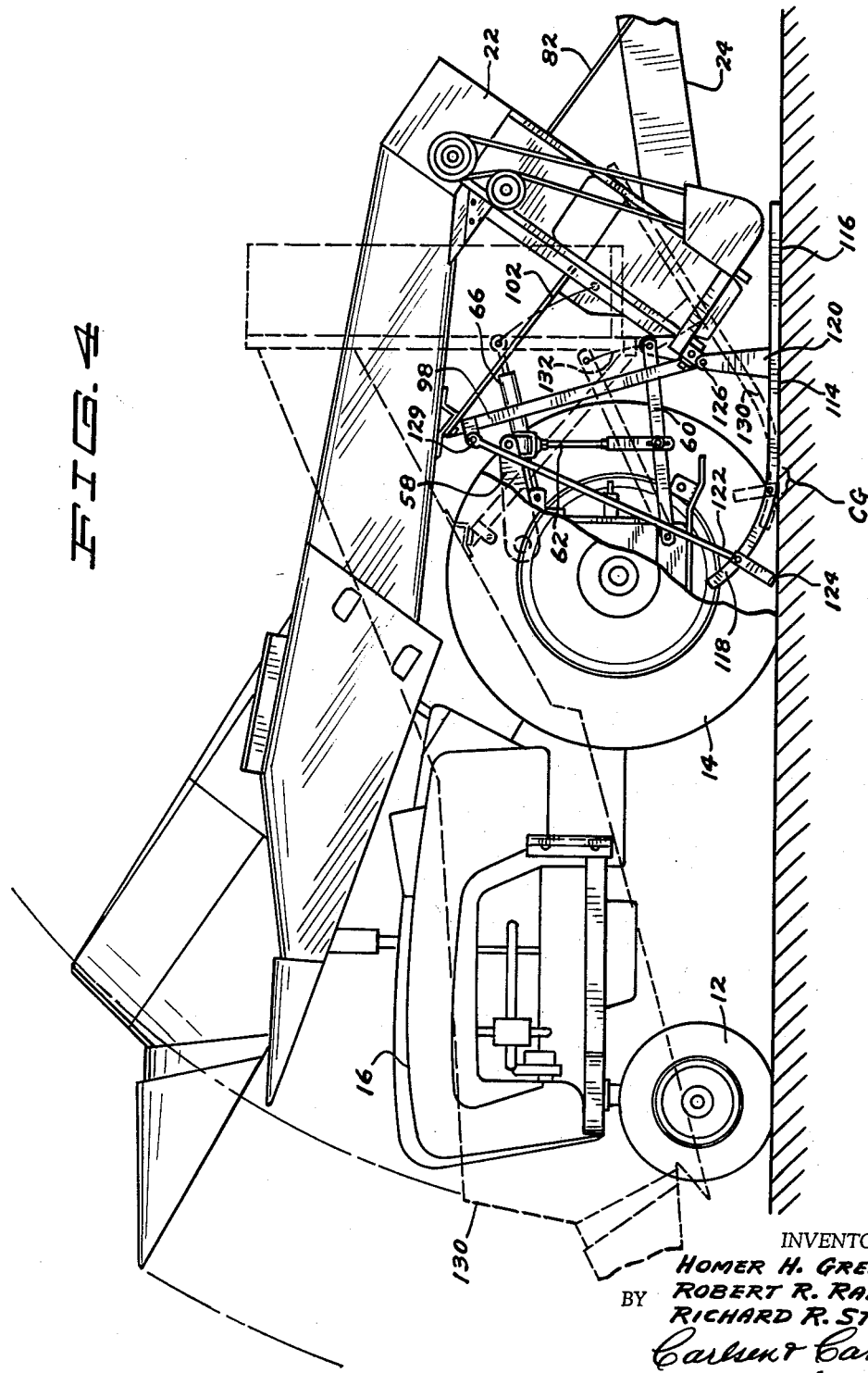

United States Patent Office 3,159,956
Patented Dec. 8, 1964

3,159,956
TRACTOR MOUNTED HARVESTERS
Homer H. Green and Robert R. Radke, Minneapolis, Minn., and Richard R. Steingas, Naperville, Ill., assignors, by mesne assignments, to Minneapolis-Moline, Inc., Hopkins, Minn., a corporation of Delaware
Original application Apr. 15, 1959, Ser. No. 806,651, now Patent No. 3,043,376, dated July 10, 1962. Divided and this application Dec. 1, 1961, Ser. No. 156,371
2 Claims. (Cl. 56—15)

This invention relates generally to tractor mounted agricultural implements and more particularly to improvements in the construction thereof for permitting power lift hitch mounting of large harvesters such as a two-row corn harvester. The invention is disclosed in and this is a divisional application of Serial No. 806,651, filed April 15, 1959, now Patent No. 3,043,376 issued July 10, 1962.

Tractor mounted harvesters have certain advantages over the pull-behind types of equipment in that the agricultural crop is severed from the ground in advance of the tractor so that there is less damage in opening a field. Additionally the tractor operator is in an improved position to observe the harvesting operation and to properly maneuver the machine. Another advantage of the tractor mounted farm implement is that the tractor-implement combination is quite compact permitting turns of very short radii and transport from one field to another without difficulty. Still another advantage is that the harvester does not require any supporting running gear as the tractor provides complete support for the implement.

Farm implements have been previously tractor mounted by various means to obtain the advantages listed above such as shown in the Korsmo and Ronning Patent 2,831,-307 for a tractor mounted two-row corn planter. This invention provides improvements over that patent in that the entire harvester is pivotably and solely supported by a power lift hitch at one end of the tractor. The harvester is pivotable about a horizontal moving axis formed by two transversely spaced pivots on the hitch as it is rocked on the ground between a detaching-attaching "rearward rocked" position in which the harvester may be stably ground supported and a horizontal "forward rocked" position in which the hitch is a necessary support element for the harvester. The utility of such improvements will become apparent from a reading of the specification.

Implements have been tractor hitch mounted wherein the fore and aft center of gravity is located approximately on or to the rear of the transverse line of connection between the hitch and the implement. In this invention the fore and aft center of gravity is located forward of said transverse line. The implement is carried solely by the power lift hitch at the rear of the tractor. One of the improvements of this invention provides for hitch mounting a large harvester wherein the harvester encircles the tractor when in the operating position and yet permits the tractor to be driven to and away from the hitch connecting means when in a tilted position without disassembling nor driving over any part of the implement.

The hitch mounted harvester is constructed on a single rigid frame and can be connected to the tractor through a hitch having only three load bearing pivotal connections thereby providing extremely rapid attachment and detachment of the harvester from the tractor.

Also in accordance with this invention the harvester elevation from the field as well as the operating angle is controlled solely by the mounting hitch without any load supporting nor vertical travel limiting means on the other end of the tractor. Therefore the inclination and elevation of the harvester is provided solely by a single mount rather than a plurality of mounts. Rub bars are preferably interposed between the other end of the tractor and the harvester for preventing lateral swaying of the implement.

Therefore an object of this invention is to provide various structural improvements in the construction and support of mounted type harvesting implements wherein extremely large harvesters are mounted on a single power lift hitch and wherein the mounted implement receives its entire vertical support from the tractor from a hitch located at the rear of the tractor.

Another object of the invention is to provide a tractor-implement combination wherein the implement has a crop gathering unit located forward of the tractor rear axle and a crop processing unit located rearward of said axle with the implement receiving its entire vertical support from a hitch located at the rear of the tractor and wherein the fore and aft center of gravity of the implement is located forward of the transverse line of connection between the implement and hitch to reduce the loads within the lift mechanism and increase the longitudinal stability of the combination.

Still another object of the invention is to provide a tractor-implement combination wherein the implement is mounted in encircling relation on the tractor and with rocker members positioned on the implement for ground engagement near the longitudinal center of gravity of the implement to facilitate rocking of the implement between a forward use position and a rearwardly rocked position with the implement forward portion elevated enabling the tractor to be driven into or out of the implement during the mounting or dismounting operations.

These and other more detailed and specific objects will be disclosed in the course of the following specification, reference being had to the accompanying drawings; in which—

FIG. 3 is an enlarged side breakaway view of the tractor hitch and the main framing of the corn harvester of FIG. 1.

FIG. 4 is a side elevational view of the FIG. 1 apparatus wherein the corn harvester is in a detaching-attaching "rearward rocked" position with the "forward rocked" position indicated by a dashed outline of the harvester.

FIG. 5 is a transverse vertical section taken on line 5—5 of FIG. 1.

Figure 1:
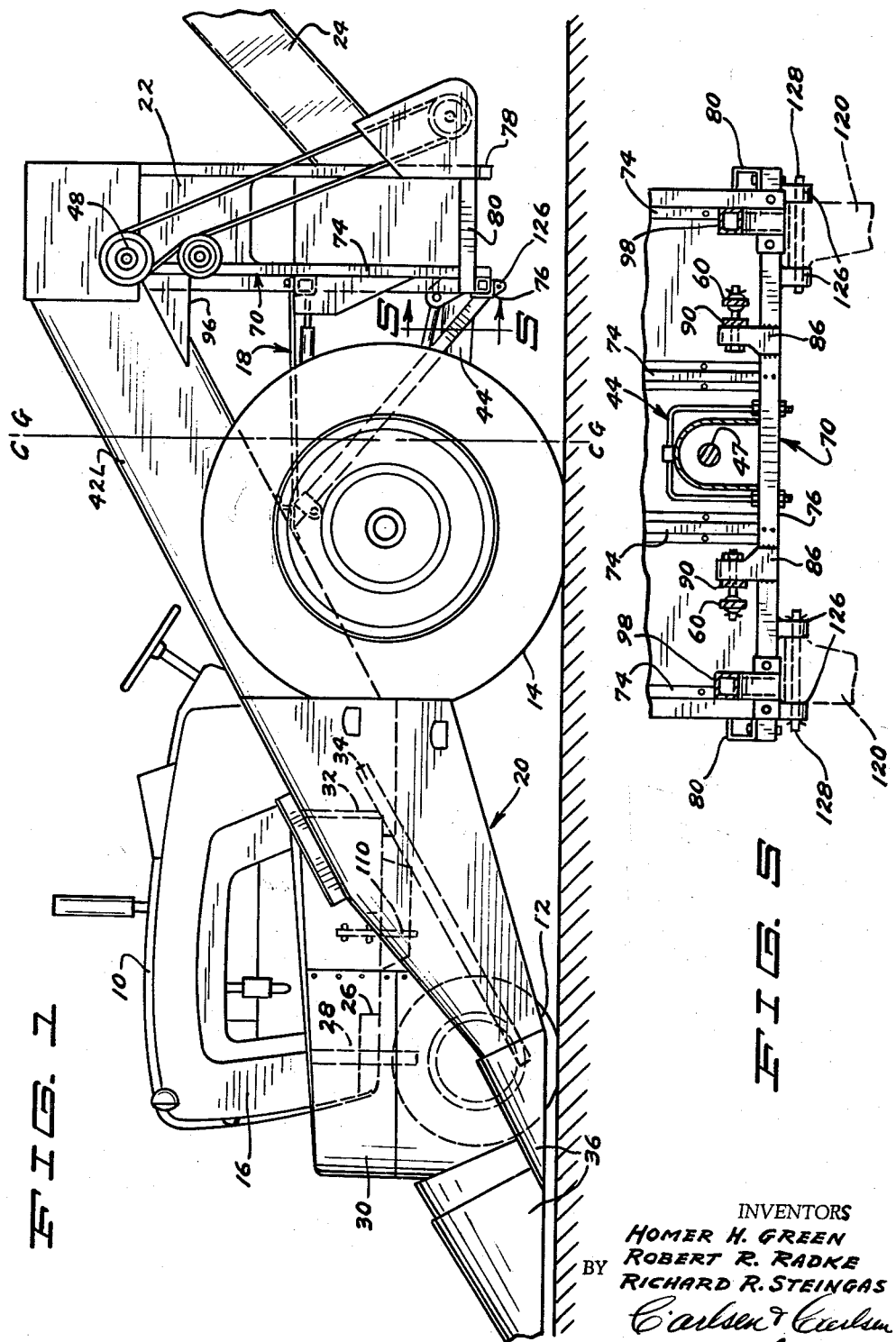
FIG. 1 is a side elevational view of an exemplary embodiment of this invention in a crop harvesting position.
Figure 2:
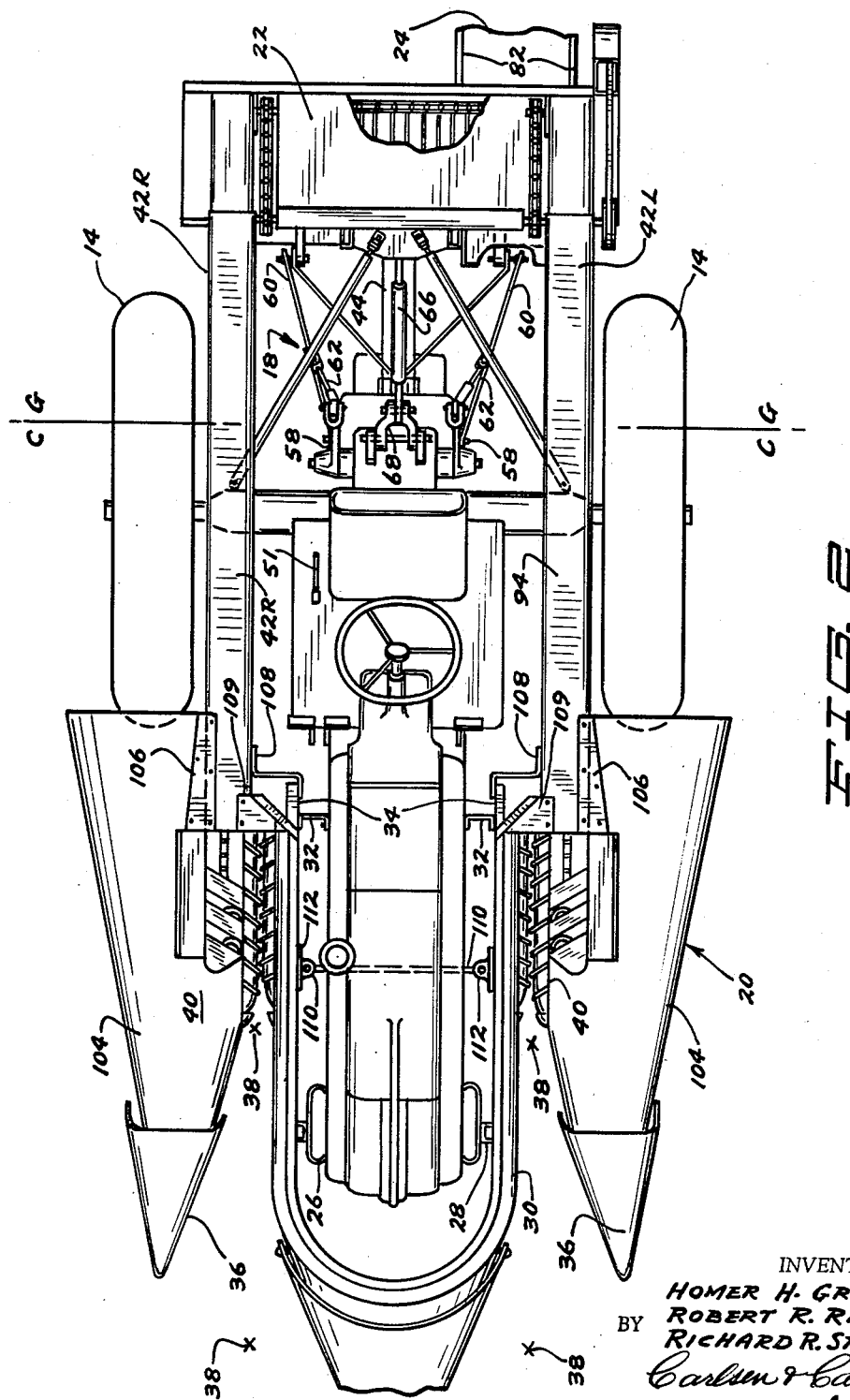
FIG. 2 is a plan view of the FIG. 1 apparatus.

With reference now to the figures like numbers denote like parts and structural features as shown in the various view. As best shown in FIGS. 1 and 2 there is a usual farm tractor 10 with the conventional front steering wheels 12 and the outwardly spaced rear traction wheels 14 and a long narrow longitudinally extending body portion 16 housing an internal combustion engine used to drive the traction wheels and the power take-off later described. At the rearward end of the tractor between the traction wheels 14 there is mounted a hydraulically operated conventional heavy duty hitch 18, commonly referred to as a "three-point" hitch. According to the teachings of this invention there is mounted on hitch 18 a corn harvester comprising a forwardly disposed two row snapper unit 20 and a husker unit 22 rearwardly thereof with both units 20-22 forming a rigid single piece of machinery. Rearwardly of the husker unit there is the usual husked corn elevator 24 for transporting the corn to a wagon box (not shown). It is understood that the corn harvester is used to illustrate the invention with no limitation thereto being intended.

Broadly speaking the snapper unit 20 represents a "crop gathering" device while the husker unit 22 is illustrative of a "crop processing" device.

The illustrated corn harvester is mounted only on the rearward hitch 18 with no supporting connections at any other point. It is appreciated that the corn harvester extends forward of hitch 18 a distance greater than the wheel base of tractor 10 and as a result tends to wobble on the hitch. This is prevented by transversely engaging the center divider 30 of the snapper unit 20 with body 16 by two pair of "rub bars." A front pair of rub bars 26 on the tractor body engage the picker front pair of rub bars 28 as best seen in FIG. 2, while a rear pair of tractor rub bars 32 likewise engage center divider 30 side frame member 34. It is understood that these bars provide no vertical support and serve only to prevent swaying of the snapper unit 20 with respect to the tractor forward end. These bars will be more fully explained later.

The corn harvester may be considered as a conventional corn picker with no part of the internal workings thereof forming a part of this invention. For a detailed description of the internal workings of a corn harvester suitable for being constructed on a single frame as will hereafter be fully described, see the above referred to Korsmo and Ronning patent. The illustrated corn harvester will now be generally described to aid in the complete understanding of this invention.

The two row crop gathering and severing or snapper unit 20 has three flexibly mounted snouts 36 to comb and gather the corn stalks 38 into the snapping rolls and gathering chains 40 on both sides of the tractor. Extending rearwardly from snapping rolls and gathering chains 40 and disposed outwardly therefrom are right and left hand snapped ear elevators 42L and 42R. As is the usual practice elevators 42L and 42R are disposed between the traction wheels 14 and the rearward end of body portion 16. Elevators 42 transport the corn to husker unit 22 where corn ears are husked in the manner described in the Korsmo and Ronning patent.

The corn harvester is driven by the tractor engine through the usual power take-off connection 44 having power take-off shaft 46 coupling the driven picker mechanisms including the pulley assembly 48 to the power take-off system of tractor 10. The usual universal connection in shaft 47 permits the harvester to be raised and lowered with respect to the tractor.

When there are a lot of corn stalks down on the ground it is the usual practice to run the snouts 36 along the ground to comb and gather more effectively. This is permissible with this picker, it being understood that the ground engagement is not one of support but one for more effective harvesting.

The tractor-harvester load bearing connections will now be described in detail with particular reference to FIGS. 2, 3, and 5. Three-point hitch 18 has the usual hydraulic lift or fluid motor 50 mounted on the rear axle housing 52 of tractor 10 and controlled by operating lever 51. A transverse rock shaft 56 suitably connected to lift 50 for rocking or oscillating movement about its axis and carries a pair of rearwardly extending transversely spaced crank arms 58. Each of the arms 58 pivotally supports a lower trailing forwardly pivoted draft link 60 by means of an adjustable lifting link 62. Draft links 60 are pivoted to the tractor chassis on a common transverse axis as at 64. Upper or tension link 66 has its forward end pivoted to the tractor chassis at 68. The just described three transversely disposed links provide the "three-point connection."

The just described hitch has each of the three links pivotally connected to the upright transversely extending box-like main frame 70 of the corn harvester. Frame 70 centrally supports the corn hopper 72, wagon box or husked corn elevator 24, husker unit 22, and forms a rigid base for the snapper unit 20 as will become apparent.

Frame 70 consists of several channel-shaped steel members bolted or welded together. Four forward vertical steel members 74 are bolted or welded to upper (not shown) and lower transverse channel members 76. Completing the box-like frame there is a rear frame 78 similar to the just described forward frame portion 74–76 with several longitudinally extending steel channel members 80 connecting the two frame portions. Husker unit 22 and hopper 72 are supported inside the frame 70 adding rigidity thereto when elevator 24 is supported on the lower end of frame 70 with stabilizing bars 82 connecting an upper part of frame 70 with the elevator as best seen in FIGS. 2 and 4.

Draft links 60 are pivotally connected by balls and sockets 84 to forwardly and upwardly extending arms 86 on member 74 while the upper link 66 is vertically pivoted to frame 70 by a pin 87 in transverse support assembly 88 located between two vertical members 74. The just described transversely triangularly disposed pivotal connections between hitch 18 and frame 70 cause the corn harvester to raise and lower with substantially the same longitudinal inclination as the draft or lower links 60 are correspondingly raised or lowered as rock shaft 56 is rocked about its axis.

To provide additional stability to the mounted harvester, stabilizer members 90 are pivotally connected between transversely spaced arms 86 and a center pivotal connection 92 as best seen in FIG. 3. Additionally for providing a lower limit to the vertical movement of the harvester on the just described hitch 18 chains (not shown) may be added between the tractor chassis near pivot 68 and the draft links 60.

As seen in FIG. 3 upper or tension link 66 is made adjustable by turnbuckle 67 for controlling the longitudinal inclination of the corn harvester for optimum harvesting operations. No other manual mounting adjustments are necessary with the operating height being hydraulically controlled as above described. Thus it is seen the hitch 18 provides all necessary mounting adjustments for successful operation of a harvesting machine.

The snapped ear elevators 42 have a heavy sheet steel housing generally designated by numeral 94. The housing forms the support for the elevator mechanism within and the snapper unit 20 mounted forwardly thereon. The upward and rearward ends of each elevator housing 94 is securely bolted to the upper end of frame 70 and a pair of transversely spaced gusset plates 96 providing added rigidity to those connections. Two channel-shaped braces 98 extend diagonally and respectively between opposite extremities of lower frame member 76 and the two brace brackets 100 on the underside of housings 94. The support framing between the housings 94 and frame 70 is completed by the two brace rods 102 respectively rigidly connecting the assembly 88 with the brackets 100.

Each housing 94 extends forwardly of the snapping rolls and gathering chains 40 to support the outer heavy steel guide sheets 104 and the outer ones of the snapping rolls and gathering chains. Plates 106 provide additional support to the sheets 104 from housings 94 upper sides. The center divider 30 is also constructed of heavy sheet steel and has a pair of stiffening side frame members 34 affixed to the sheet steel and extending diagonally upwardly from the bight end to the rearward leg ends of the divider as best seen in FIGS. 1 and 2. The divider 30 upper portion is also attached to housing 94 as by plates 109. Additional supporting members may be added as desired. In any event the center divider is rigidly attached to housings 94, and the manner of attachment following the usual construction practice of farm machinery and not being important to the present invention.

In addition to the above described framing housings and stiffening members for providing a rigid frame to the picker a detachable transverse U-shaped member 110 extending under the tractor engine is slidably supported on opposite sides of divider 30 in apertured plates 112 by a suitable cotter key or pin. This latter member does not in any way engage the tractor 10, rather it is used solely to provide additional rigidity to divider 30.

Having described the rigid framing of an exemplary hitch-mounted two-row corn harvester the attachment and detachment of the harvester on and off of the hitch will now be described. In detaching the harvester from the tractor transverse support member 110 is firstly removed from plates 112 for permitting snapper unit 20 to be rocked over the tractor as will be subsequently described.

The next detaching step is raising the corn harvester by the hitch to an "extreme raised position" providing ample clearance for the harvester underside attachment of a pair of rocker assemblies 114 as seen in dashed outline in FIG. 4. Each rocker assembly 114 consists of a runner 116 having a forwardly upwardly curved portion 118, an intermediate upright arm 120, a forward upright pivotally mounted member 122 and a U-shaped pivotally mounted dog 124 for adding ground engaging stability to the harvester as will become apparent. The attachment of arms 120 of the pair of skids 114 to frame 70 is best seen in FIG. 5. Horizontal lower transversely extending frame channel member 76 has at each transverse end a pair of depending apertured members 126. The upper ends of arms 120 are apertured and have a relatively broad transverse dimension for providing transverse stability and are adapted to fit between said paired members 126 for receiving a connecting pin 128. Arms 122 likewise have apertured upper ends and are pin connected to apertured U-shaped brackets 129, one bracket being rigidly attached to transversely spaced support braces 98.

After the just described rocker assemblies are attached the hitch 18 is operated to lower the harvester until the rockers engage the ground as indicated by dotted lines 130 in FIG. 4, this position being termed a "forward rocked position." The corn harvester is horizontal but further off the ground than normal operating height. Now the upper link 66 of hitch 18 (FIG. 3) is detached from harvester main frame 70 by removing the pin 87 from assembly 88 freeing the harvester to rock rearwardly on ground engaging curved portions 118 of runners 116.

The weight of the harvester is distributed such that in the forward rocked position there is a slight tendency to rock rearwardly on the runner assemblies 114. The pair of lower or draft links 60 are lowered from a position indicated by dashed lines 132 permitting rearward rocking the implement on the rockers. As it rearwardly rocks the harvester also pivots clockwise on the lower links 60 raising the center divider 30 bight to overhang the tractor in the rearward rocked position as seen in FIG. 4 wherein the runner assemblies 114 rearward flat runner portions are engaging the ground. During this rocking motion the assemblies 114 rock on the ground as the harvester pivots on links 60 and the tractor rolls backward. After the harvester has reached the rearward rocked position U-shaped dogs 124 are pivoted from an upward position to a ground engaging position for preventing the forward rocking of the harvester. Next links 60 and stabilizer members 90 are respectively disconnected from the harvester and tractor by removal of their respective locking pins and the power take-off is disconnected in the usual manner. As seen in FIG. 4 there is ample clearance under the center divider 30 to permit the tractor body 16 and the operator (not shown) to move thereunder as the tractor is driven forwardly away from under the harvester to completely free the tractor from the harvester.

As aforementioned the weight of the harvester is distributed longitudinally such that it tends to rearwardly rock from the forward rocked position. The runner assemblies 114 are positioned and shaped so that as the harvester rocks thereon the center of gravity as located longitudinally remains a relatively constant and short distance to the rear of a ground engaging portion of the assemblies 114. In FIG. 4 the letters CG indicate the approximate fore and aft location of the center of gravity as it shifts with respect to the ground in maintaining the above described relation to the ground engaging portion of the rockers. The dogs 124 are used as a safety means to prevent wind or other small forces from rocking the harvester when it is in the "rearwardly rocked" or "storage" position. To begin the harvester rearwardly rocking the tractor 10 may have to be backed slightly or alternately a slight manual downward force may be exerted on the rear elevator 24.

It will also be clearly understood from FIG. 4 and the lines CG on FIGS. 1 and 2 that the longitudinal center of gravity of the implement is disposed forwardly of the transverse line of implement vertical support formed by hitch connections at 84 or the transverse plane formed by connections 84 and 87. Thus the center of gravity of the implement in either forwardly rocked or operative position is disposed forward of the hitch connection to reduce the loads on the lift mechanism and slightly rearward of the point of ground engagement of the rockers 114 to facilitate rearward rocking of the implement.

To attach the harvester to the hitch the tractor 10 is backed under the harvester until draft or lower links 60 can be connected thereto and stabilizers 90 attached to the hitch. Next dogs 124 are pivoted to an upward position as shown in FIG. 4 by dashed lines 130. The links 60 may be rotated upwardly causing the harvester to rock on assemblies 114 to the forward rocked position.

As the harvester rocks forwardly the side frame 34 of divider 30 engages the channel-shaped vertically-extending tractor rub bars 32 outer flanges. Both bars 32 are engaged substantially simultaneously and act as guides keeping the snapper unit 20 transversely centered with respect to the tractor body 16. The upper ends of the rub bar 32 outer flanges may be tapered for transversely urging the divider 30 into the centered transverse location.

As the forward rocking is continued vertical extending channel-shaped rub bars 28 on the picker engage longitudinally oblong tractor front end rub bars 26 as best seen in FIG. 2. The lower ends of bars 28 may be tapered in the same manner as the upper ends of bars 32.

When the harvester has reached the forward rocked position, the upper link 66 is connected to assembly 88 by pin 87, the harvester is raised, the skids 114 removed, and the power take-off connected. While being transported it is not necessary to attach transverse stiffening member 110. However, during corn harvesting operations it is preferred that member 110 be installed on center divider 30.

As best seen in FIG. 2 the exemplary corn harvester is particularly adapted to have its intermediate portion, i.e., the snapped ear elevators 42, to fit between the traction wheels 14 and yet as best seen in FIG. 1 are located vertically close to the upper portion of traction wheels 14 such as to not limit the side and forward vision of the operator.

Thus, there is shown exemplary apparatus whereby the various objects and advantages of this invention have been successfully achieved. It is understood that suitable modifications may be made in the structure as disclosed, provided such modifications come within the spirit and scope of the appended claims. Having now therefore fully illustrated and described our invention, what we claim to be new and desire to protect by Letters Patent is:

1. An implement adapted for mounting on a tractor having rear traction wheels and a rearwardly extending power lift hitch, a crop processing unit adapted to be mounted on the hitch for raising and lowering movement therewith, a pair of crop harvesting units integrally connected to the processing unit to extend forwardly therefrom one along each side of the tractor and forwardly of said rear wheels, the mounting of the processing unit on the hitch including a pivotal connection having a transverse pivot axis located rearwardly of said rear wheels, a rocker member integrally mounted on the implement and having a forward convex lower surface adapted to engage the ground forward of said axis as the processing unit is lowered whereby with continued lowering movement the processing unit and the harvesting units will rock rearwardly on the rocker member and about said axis until the processing units have been raised higher than the traction wheels.

2. In a tractor-implement combination, a tractor having a body supported at its rear end by a pair of coaxial power driven traction wheels disposed on opposite sides of the body, a power lift hitch extending rearwardly from the body and operatively connnected to the body for raising and lowering movement about its front end, an implement having a crop processing unit located to the rear of the body and a pair of crop harvesting units extending forwardly from the processing unit along opposite sides of the body, said harvesting units being rigidly and unbendingly connected to the processing unit so that said units combine to form a rigid unitary implement, the lift hitch having a pair of vertically spaced attachment portions to the rear of the traction wheel axis, the processing unit being connected to said attachment portions with the lower connection thereto being on a transverse pivot and the upper connection being detachable, the longitudinal center of gravity of the implement being forward of said transverse pivot when said connections are engaged, and a rocker member on the underside of the crop processing unit having its lowermost portion located substantially on said center of gravity for engagement with the ground forward of said transverse pivot as the hitch is lowered to allow rearward rocking of the implement about said pivot when said upper connection is detached.

References Cited in the file of this patent
UNITED STATES PATENTS

| | | |
|---|---|---|
| 2,958,993 | Slavens et al. | Nov. 8, 1960 |
| 2,995,001 | Muller et al. | Aug. 8, 1961 |